April 26, 1932.  W. F. KEENAN, JR  1,855,745
FLUID HEATER
Filed May 19, 1926  2 Sheets-Sheet 1

INVENTOR
WALTER F. KEENAN, JR.
BY
ATTORNEY

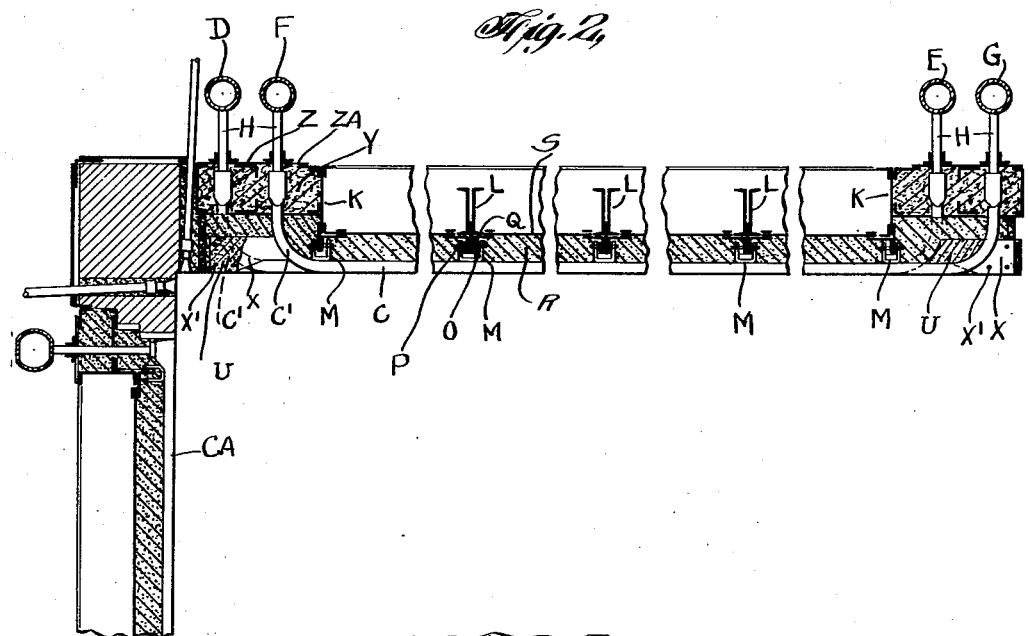
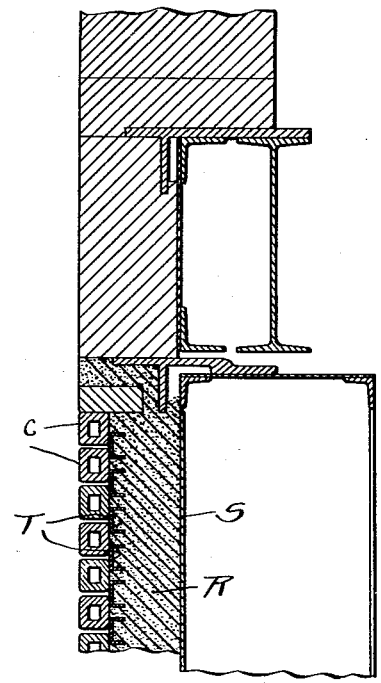

Patented Apr. 26, 1932

1,855,745

UNITED STATES PATENT OFFICE

WALTER F. KEENAN, JR., OF PELHAM, NEW YORK, ASSIGNOR TO FOSTER WHEELER CORPORATION, OF NEW YORK, N. Y., A CORPORATION OF NEW YORK

FLUID HEATER

Application filed May 19, 1926. Serial No. 110,180.

My present relates to fluid heaters in which the fluid handled is under a high pressure such as the steam pressures of 1000 or 1200 pounds per square inch, which are now coming into use in some central station power plants; and the general object of my invention is to provide a radiant heat superheater or analogous device with a conduit and header arrangement suitable for the intended use and characterized by the increased strength of the headers and conduit connections thereto as compared with analogous constructions advantageously employed with lower pressures. A characteristic feature of the invention is the connection of the adjacent ends of adjacent conduit elements into different headers, whereby the distance between adjacent conduit connections to any one header may be two or more times what it would be if the adjacent ends of adjacent conduit elements were connected into a single header in accordance with the usual practice. With the high pressures referred to, the close spacing of the conduit elements ordinarily required in a radiant heat superheater when subjected to the high pressures herein contemplated would result in a header unduly weak, if the conduit connections thereto were as closely spaced as they would be if the corresponding ends of adjacent conduits were connected into a single header.

The various features of novelty which characterize my invention are pointed out with particularity in the claims annexed to and forming a part of this specification. For a better understanding of the invention, however, reference should be had to the accompanying drawings and descriptive matter in which I have illustrated and described a preferred embodiment of the invention.

Of the drawings:

Fig. 2 is a partial section on the line 2—2 of Fig. 1; and

Fig. 3 is a partial section on the line 3—3 of Fig. 1.

Figure 1:
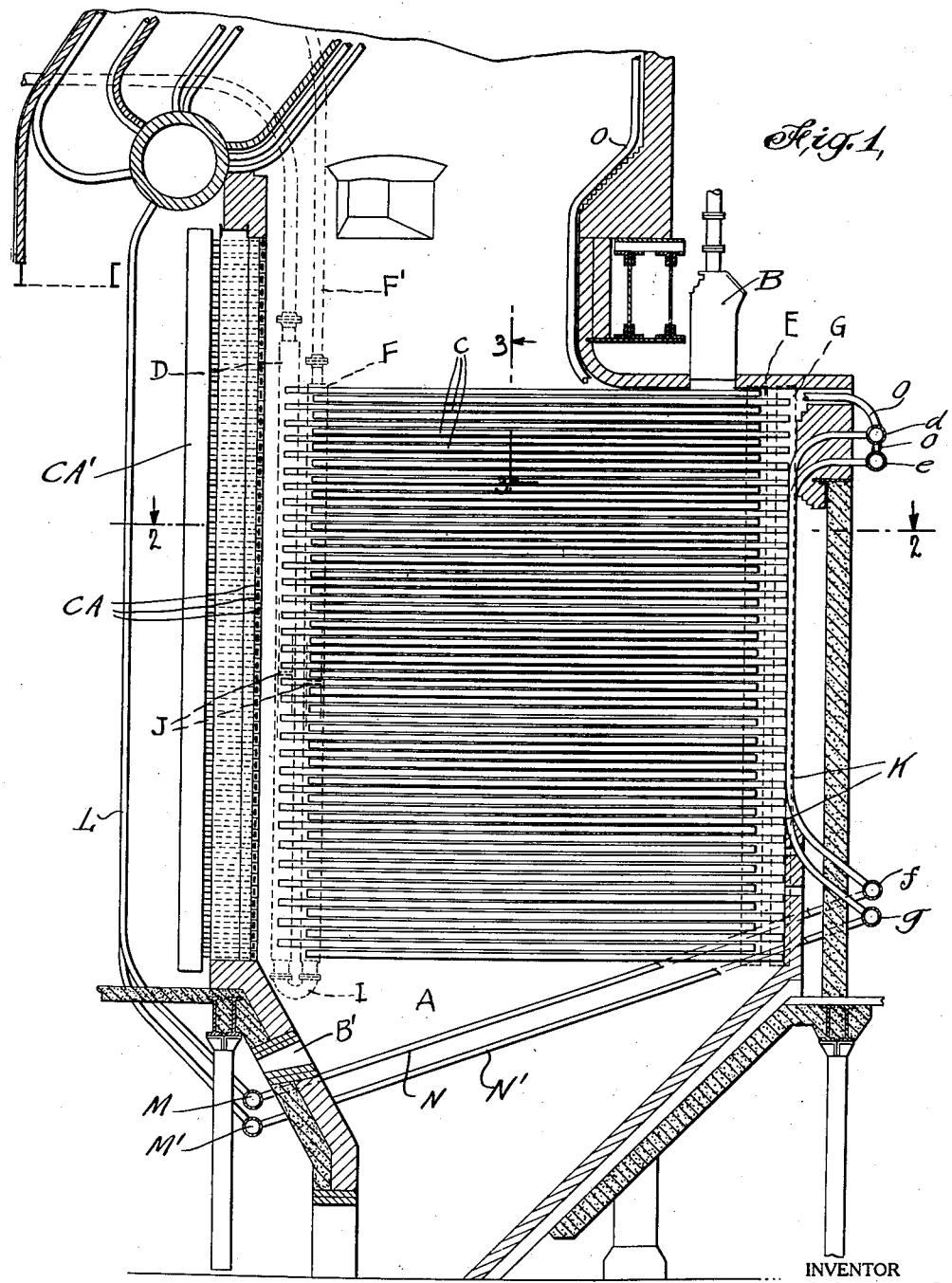
Fig. 1 is a sectional elevation of a portion of a high pressure boiler.

In the drawings I have illustrated the use of the present invention in the construction of a radiant heat superheater located in a vertical wall of the combustion chamber A of a water tube boiler shown as of the vertical water tube or Stirling type heated by the combustion of powdered coal supplied through burner nozzles B located in the upper front wall of the combustion chamber or through nozzle openings B' in the lower portion of the rear wall of the chamber. It will be understood, however, that the present invention is not dependent on the character of the boiler with which the invention is used, nor on the type of fuel burned to heat the boiler.

C represents the conduit elements of a radiant heat superheater incorporated in one of the side walls of the combustion chamber. As shown, the elements C are in the form of horizontally disposed tubes of rectangular cross section and having thick walls. Each element has out-turned wall penetrating end portions C'. The out-turned end portions of alternate elements C are connected at one side edge of the superheater to an external vertically disposed header D, and are connected at the opposite side edge of the superheater to a vertically disposed external header E. The other elements C are connected each at one end to a header F alongside the header D, and at its opposite end to a header G alongside the header E.

As shown, the connections between each conduit end and the corresponding header is made by a comparatively thin walled tube or nipple H having one end expanded into the corresponding end of the conduit C which advantageously is enlarged for the purpose, and having its other end expanded into the corresponding header D, E, F, or G. With this arrangement it will be apparent that the spacing between the conduit connections H expanded into any one header will be twice as great as it would be in a single header replacing either pair of headers D, F, or E, G, and connected to one end of each of the different elements C spaced as shown. The close spacing of the elements C illustrated is ordinarily required to provide the proper amount of superheater heat absorbing surface, and to protect the furnace wall which incorporates and is cooled by the superheater, against objectionable overheating. Those skilled in the art do not need to be told that the increased distance between the holes in the header into which the nipples H are expanded obtained by the use of the present invention desirably increases the header strength in apparatus intended for high pressure work.

In the particular construction shown, each of the headers D and F is divided into two separate end to end sections by a diaphragm or partition J, and the steam to be superheated passes initially into the upper end of the upper section of the header D, thence through the corresponding conduit elements C to the header E by which it is distributed to the elements C connected to the lower section of the header D. From the lower end of the lower section of the header D the steam passes through a return bend or analogous connection I to the lower end of the lower section of the header F from which the steam passes through the corresponding elements to the header G. From the header G the steam passes to the upper section of the header F through the elements C connected to the latter, and the superheated steam passes away from the superheater through the pipe F' connected to the upper end of the header F.

With the construction just described each particle of steam must pass successively through 4 different elements C in flowing from the superheater inlet to the superheater outlet. It will be apparent, however, that if the diaphragms J were omitted, and the headers D and E were closed at their lower ends, each particle of steam would pass successively through two elements C only. In general it is desirable to pass the steam successively through a plurality of elements as this elongation of the path of steam flow increases the degree of superheat obtainable with apparatus of given size. It is obviously feasible, when desirable, to have the steam pass but once through the elements C of a superheater constructed in accordance with the present invention. To this end it is possible, for example, to initially pass half the steam to the header D, and the remainder to the header F. In such case the diaphragms J would be omitted and the headers E and G would each serve as an outlet header.

As shown, the horizotally disposed elements C are supported and restrained against the tendency to bow or warp under the conditions of use by a heavy framework comprising vertical beams K adjacent the side edges of the superheater, and intermediate vertical beams L. Each element C is shown as connected to each of the beams K and L by a yoke member M welded to the outer side of the element and straddling a tongue part O of the corresponding beam each yoke M and tongue O being connected by a pin P. The two legs of each yoke M are separated by a distance greater than the tongue O received between the yoke legs, so that the longitudinal expansion and contraction of the elements C is not restrained. Advantageously, however, each element C is anchored to one of the beams against movement in the direction of its length relative to the beam, this anchorage being attained in the construction illustrated by interposing washers Q between the corresponding tongue O and the inner sides of the corresponding yoke M.

Gas leakage through the joints between the body portions of adjacent elements C, is prevented, and heat radiation losses from the outer sides of the elements are minimized by a packing or mass of refractory material R interposed between the bodies of the elements and metal plating S connected to, and forming a part of the supporting framework. This packing may advantageously be a so-called plastic cement composed mainly of kieselguhr plus some asbestos and a suitable binder. To prevent this material from being injuriously effected by furnace gases or the action of the cleaning fluid jets employed to remove furnace dust and slag deposits on the heat absorbing surface of the elements, the joints between the elements are covered by batten-like parts T in the form of channel bars imbedded in the material R.

The bodily thermal elongation and contraction of the elements results in some bodily transverse movements of the end portions C' of the elements. To accommodate this movement and at the same time provide protection against gas leakage through the combustion chamber wall at the side edges of the superheater as well as to provide proper heat insulation, the elbow portions of the elements C at each side edge of the superheater are imbedded in refractory material U which advantageously is a material such as the so-called plastic fire brick which can be applied in a plastic or semi-plastic condition, and which will set under the action of the heat absorbed from the furnace into a hard monolithic mass having refractory properties analogous to those of fire bricks. One material suitable for the purpose is formed of ground fire brick and a suitable clay binder, and is hammered or tamped into place while in a putty-like condition. To assist in supporting and cooling this material I advantageously weld plate-like fins X to the convex sides of the elbow portions of some or all of the elements C. As shown, at the left hand side of the superheater, fins X are welded only to the elements C connected to the header D, while at the opposite side of the superheater fins are welded only to the elbows of the elements connected to the header G. Reinforcing bars X' passing through apertures in the fins X connect adjacent fins, and provide additional reinforcement to the refractory material U. Spaces to accommodate the horizontal movement in the direction of the length of the body portions of the elements C are provided at the outer ends of each mass of material U. These spaces are advantageously filled with some readily compressible heat insulating gas leakage preventing material such as asbestos. Additional protection against gas leakage is provided by the use of a yielding packing Y of heat insulating material such as kieselguhr which surrounds the outer end portions of the elements C and is held in place by metal cover plates Z secured to the metal framework and formed with holes enlarged to accommodate the horizontal movement of the end portions of the elements, said holes being overlapped by cover plates ZA secured to the nipples H.

It will be apparent, of course, to those skilled in the art, that a high pressure superheater may be incorporated in one wall only, or in more than one wall of the combustion chamber of the boiler. In the particular installation illustrated in part by the drawings of this application, the high pressure superheater shown is duplicated in the opposing wall of the combustion chamber, while a low pressure superheater having elements CA each connected at one end to a single corresponding header CA' in the usual manner, is placed in one of the other walls of the combustion chamber.

The fourth wall of the combustion chamber is a so-called water wall being provided with a row of vertically disposed water tubes K which have out-turned end portions. The latter project outward through the boiler housing, and externally of the latter are connected to upper headers d and e, and lower headers f and g, alternate tubes K being thus connected at their opposite ends to the headers d and f while the intermediate tubes K are connected at their ends to the headers e and g. The tubes K are connected into the boiler circulating system, by connections including a row of downcomer pipes L, headers M and M' to which the tubes L are connected at their lower ends, tubes N and N' connecting the headers M and M' to the headers f and g, respectively, and return connections O through which the upper headers d and e are connected in the usual manner to the upper portion (not shown) of the boiler.

Since the tubes K and associated tubes are connected into the boiler circulating system they are subjected to the full boiler pressure and much of the advantage obtained with the high pressure superheater construction described above is obtained in the case of the tubes K by connecting corresponding ends of adjacent tubes K to different headers d and e, and f and g. However, there is a special advantage in the use of the invention in a superheater as compared with its use in connection with water tubes arising from the fact that the range of temperature variation is much greater in the case of superheater elements than in the case of boiler water tubes. The longitudinal thermal expansion and contraction of the elements resulting from changes in temperature subject the end connections to the elements to heavy stresses, and the end connections which must be made strong enough to resist the destructive effects of these stresses, which for the reasons stated, are greater in the case of superheater element than in the case of water tubes.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is:—

1. In a furnace wall superheater adapted for operation at high pressures, a row of separate side by side steam conduit elements having out-turned wall penetrating end portions, and a plurality of laterally displaced headers at one side of the row to which the corresponding end portions of the elements are connected, adjacent elements being connected to different ones of said headers and the headers connected to corresponding end portions of adjacent elements being connected together for a series flow through said adjacent elements and headers with the directions of flow in adjacent elements being opposite.

2. In a fluid heater, a plurality of similar conduit elements having elongated side by side body portions substantially in contact and laterally extending end portions, adjacent elements being longitudinally displaced with reference to one another, and headers extending transversely to said body portions to which said end portions are connected, the corresponding ends of adjacent longitudinally displaced elements being connected to different headers, and the headers connected to corresponding end portions of adjacent elements being connected together for a series flow through said adjacent elements and headers with the directions of flow in adjacent elements being opposite.

3. A radiant heat superheater adapted for operation at high pressure comprising a row of side by side steam conduit elements having relatively massive walls and having end connections with thinner walls, and a plurality of headers at one side of said row to which corresponding end portions of said elements are connected, the end portions of adjacent elements being connected to different headers, and the headers connected to corresponding end portions of adjacent elements being connected together for a series flow through said adjacent elements and headers with the directions of flow in adjacent elements being opposite.

4. The combination with a row of superheater elements at the inner side of a furnace wall, a sheathing at the outer side of said wall, refractory heat insulating and gas leakage preventing material interposed between said elements and sheathing, and metallic batten parts overlapping the joints between the adjacent elements at the outer sides of the latter.

5. A furnace wall superheater adapted for operation at high pressures comprising a vertical row of separate side by side horizontal steam conduit elements having body portions located in the same vertical plane, and out turned wall penetrating end portions, and a pair of vertical headers at each side of the row of conduit elements extending in a plane parallel to and laterally displaced from the plane of said body portions and to which the corresponding end portions of the elements are connected, the end portions of alternate elements being connected to the same headers, a transverse diaphragm in each of the headers at one side of said row, said last mentioned headers being directly connected at the lower ends thereof, and all of said headers and elements being connected for a series flow of steam therethrough with the flows in adjacent elements being in opposite directions.

6. In a fluid heater adapted for operation at high pressures, a row of separate similar conduit elements having body portions located in the same plane with their adjacent sides substantially in contact, and a plurality of headers at one side of said row to which the adjacent ends of said elements are connected, each of said headers extending substantially throughout said row transversely of the ends of said elements, adjacent elements being connected to different ones of said headers, and said headers being connected for a series flow through said adjacent elements and headers, the flows in adjacent elements being in opposite directions.

7. In a fluid heater, a row of separate similar conduit elements having body portions located in the same plane with their adjacent sides substantially in contact, and a plurality of headers at one side of said row to which the adjacent ends of said conduit elements are alternately connected, each of said headers extending substantially throughout said row transversely of the ends of said elements, and said headers being connected for a series flow through said adjacent elements and headers, the flows in adjacent elements being in opposite directions.

8. In a fluid heater adapted for operation at high pressures, a row of side by side similar conduit elements having body portions located in the same plane with their adjacent sides substantially in contact, and a plurality of headers at each side of said row to which the conduit elements are alternately connected, each of said headers extending substantially throughout said row transversely of the ends of said elements, and said headers at one side of said row being connected for a series flow of fluid through adjacent elements and said headers, the flows in adjacent elements being in opposite directions.

9. In a radiant heat superheater adapted for operation at high pressures, a row of separate side by side steam conduit elements having body portions located in the same plane, and a plurality of headers at one side of the row of conduit elements to which the corresponding ends of said conduit elements are connected, adjacent elements being connected to different ones of said headers, each of said headers extending substantially throughout said row transversely of the ends of said elements, and said headers being connected for a series flow through said adjacent elements and headers, the flows in adjacent elements being in opposite directions.

Signed at New York city, in the county of New York and State of New York, this 18th day of May, A. D. 1926.

WALTER F. KEENAN, Jr.